United States Patent [19]

Argo et al.

[11] 4,086,070

[45] Apr. 25, 1978

[54] FIBER BED SEPARATOR AND METHOD FOR SEPARATION OF AEROSOLS FROM GASES WITHOUT RE-ENTRAINMENT

[75] Inventors: Wesley B. Argo, Town & Country; Gilbert K. C. Chen, Manchester; Babur M. Kocatas, Clayton; Steven A. Ziebold, Mehlville, all of Mo.

[73] Assignee: Monsanto Company, St. Louis, Mo.

[21] Appl. No.: 737,291

[22] Filed: Nov. 1, 1976

Related U.S. Application Data

[63] Continuation-in-part of Ser. No. 642,921, Dec. 22, 1975, abandoned.

[51] Int. Cl.² ............................................. B01D 46/02
[52] U.S. Cl. .......................................... 55/97; 55/185;
55/486; 55/DIG. 25; 55/418
[58] Field of Search ................... 55/97, 185, 186, 259, 55/486–488, DIG. 25, 418; 210/315, 491

[56] References Cited

U.S. PATENT DOCUMENTS

| 2,402,140 | 6/1946  | Heintzelman ........................ 55/482 |
| 2,692,654 | 10/1954 | Pryor .................................... 55/487 |
| 2,947,383 | 8/1960  | Schytil et al. ......................... 55/98  |
| 3,066,462 | 12/1962 | Yap et al. ............................. 55/97  |
| 3,107,986 | 10/1963 | Plaut et al. ........................... 55/97  |
| 3,208,205 | 9/1965  | Harms et al. ......................... 55/487 |
| 3,339,351 | 9/1967  | Carmichael, Jr. et al. .......... 55/475 |
| 3,540,190 | 11/1960 | Brink, Jr. ............................. 55/97  |
| 3,745,748 | 7/1973  | Goldfield et al. .................... 55/97  |
| 3,802,160 | 4/1974  | Foltz .................................... 55/187 |
| 3,890,123 | 6/1975  | Kuga .................................... 55/486 |

FOREIGN PATENT DOCUMENTS

291,547  7/1971  U.S.S.R. ............................... 55/488

OTHER PUBLICATIONS

Zander–Microfilter Brochure, Zander Aufbereitungtechnik, 5/12/75.

Primary Examiner—Frank W. Lutter
Assistant Examiner—David L. Lacey
Attorney, Agent, or Firm—Arthur E. Hoffman

[57] ABSTRACT

A fiber bed separator and method are provided for separating aerosols of 3 microns and less from gases. Two fiber beds in intimate contact with one another are used. The first fiber bed, in the direction of gas flow is of fibers of at least about 5 microns mean diameter packed to a bed voidage of from about 85 to 98%, the fiber diameter and bed voidage being selected such that at design bed velocity and aerosol loading the first bed is not flooded and the residual saturation of said first fiber bed against gas drag on the liquid collected is less than the residual saturation of said bed against gravity drainage of the liquid. The second fiber bed is packed to a bed voidage of from about 85 to 99% with fibers of equal or greater mean diameter than those in the first fiber bed such that the residual saturation of said second fiber bed against gas drag is greater than the residual saturation of the bed against gravity drainage. In various preferred embodiments are high efficiency separators using fibers of from about 5 to 20 microns mean diameter in the first fiber bed and from about 25 to 35 microns in the second fiber bed; and high velocity separators using fibers of from about 25 to 75 microns mean diameter in the first fiber bed and from about 30 to 300 microns in the second fiber bed.

21 Claims, 7 Drawing Figures

FIG. I.

FIBER BED SEPARATOR AND METHOD FOR SEPARATION OF AEROSOLS FROM GASES WITHOUT RE-ENTRAINMENT

RELATED APPLICATION

This application is a continuation-in-part of copending application Ser. No. 642,921, filed Dec. 22, 1975, now abandoned.

BACKGROUND OF THE INVENTION

This invention relates to an improved fiber bed separator and process for the separation of aerosols from gas streams. More particularly, it relates to a fiber bed separator and process whereby re-entrainment of the collected liquid phase from aerosol containing gases is substantially prevented so as to allow extension of the operating ranges of gas bed velocity and/or aerosol loading beyond that of conventional fiber bed separators.

DESCRIPTION OF THE PRIOR ART

Fiber bed separators have found widespread use in applications wherein extremely fine aerosols of under 3 microns, and particularly under 1 micron, in particle size must be separated from a gas or vapor (hereinafter and in the claims collectively referred to as gas) stream. Fiber beds of up to 20 microns fibers have been found to remove sub-micron up to 3 micron sized aerosols with high collection efficiency, for example, as high as 98-99.9% efficiency. In applications requiring or permitting treatment of such aerosol containing gases at high bed velocities, such as for example 300 feet per minute (91.4 meters per minute) or more, larger diameter fibers have been used, e.g., about 25 to 50 microns, with some sacrifice in collection efficiency but even then efficiencies of 85 to 95% are attainable. Some of the more frequent applications include removal of acid mists, such as sulfuric acid mist, in acid manufacturing processes, plasticizer mists in, for example, polyvinyl chloride floor or wall covering manufacture, water soluble solid aerosols such as, for example, emissions from ammonium nitrate prill towers. In removal of water soluble solid aerosols, the collected particulates are dissolved in a liquid within the fiber bed through use of an irrigated fiber bed or of a fogging spray of liquid such as water injected into the gas stream prior to the fiber bed.

Re-entrainment of collected liquid from the downstream surface of the fiber bed is often a problem with fiber bed separators. When the aerosol in the gas being treated is a mixture of particulates ranging in size from sub-micron to a few microns, the re-entrained particles normally have been coalesced in the fiber bed to a much larger average size. The larger drops present a problem in that some supplemental removal must be performed downstream, but a much greater problem with re-entrainment is that a significant amount of sub-micron up to several micron in size particles are also formed which present a much more difficult downstream separation problem than do the larger droplet sized particles. In the part, this re-entrainment problem has been handled in a variety of ways.

A downstream impingement baffle is often used whereby the gas is caused to change its direction of flow by the baffle while re-entrained particles of heavier mass impinge on the baffle surface and drain down. This is adequate for removal of particles of great enough size and mass that their inertia will cause them to strike the baffle rather than continue to flow with the gas around the baffle. It does not effectively remove, however, the smaller particles below about 3 microns in size, which because of their low mass will tend to flow around the baffle with the gas.

A downstream mesh pad or filter is often used, but normally to avoid further significant pressure drop requiring higher power requirements to move the gas, such downstream mesh pad or filter is normally of such large fiber diameter, loose packing density and small bed depth that again only the lrger size particles are removed with any high degree of efficiency.

Another solution has been to avoid re-entrainment entirely by designing the fiber bed separators such that the gas velocity through the bed (i.e., the bed velocity) and/or aerosol loading are sufficiently low that the amount of re-entrained particles are held within practical or acceptable limits. This is, in fact, the upper limit of bed velocity and aerosol loading currently used as the design criteria for conventional fiber bed separators. This approach requires larger sizing of the fiber bed separator to provide greater bed surface area in the plane transverse to the direction of gas flow than is needed in the present invention, and results in higher equipment cost per unit volume of gas treated.

SUMMARY OF THE INVENTION

It is an object of this invention to provide a fiber bed separator for treatment of aerosol containing gases without any substantial degree of re-entrainment at bed velocities which otherwise would result in re-entrainment.

In one sense as used herein a fiber bed separator is a fiber bed element in which separation occurs. In another sense a fiber bed separator includes the element and the vessel and appurtenant hardware comprising an operative piece of equipment.

A further object of this invention is the provision of a method for treatment of aerosol containing gases without any substantial degree of re-entrainment at bed velocities which otherwise would result in re-entrainment.

Another object is the provision of such fiber bed separators, and a method for removal of sub-micron and larger aerosol particulates with high collection efficiency.

Another object is the provision of such fiber bed separators, and a method for removal of sub-micron and larger aerosol particulates from high volumes of gases at high bed velocities.

These and other objects are obtained by a method and separators employing such method which comprises providing at least one fiber bed separator element comprising, in the direction of the gas flow (a) a non-matting first bed of randomly distributed fibers having a mean fiber diameter of at least about 5 microns packed to a substantially uniform bed voidage of from about 85 to 98%, said mean fiber diameter and said bed voidage being selected such that at design gas velocity and aerosol loading said first fiber bed will be mechanically stable and will not flood with collected liquid phase and the residual saturation of said first fiber bed against gas phase drag of the liquid phase is less than the residual saturation of said bed against gravity drainage of the liquid phase, and (b) a non-matting second bed of randomly distributed fibers, preferably of from about 15 to about 200 microns mean fiber diameter, packed to a bed voidage of at least about 85%, and preferably from about 90 to 99%, said mean fiber diameter and bed voidage being selected such that said second fiber bed will be mechanically stable and the residual saturation of said second fiber bed against gas phase drag of the liquid phase is greater than the residual saturation of said bed against gravity drainage of the liquid phase, said first and second fiber beds being disposed substantially vertically and in intimate contact with one another, such that when the gas is caused to flow substantially horizontally through said first and second fiber beds, the major portion of the collected phase will be caused to continuously drain from the interface between said first and second fiber beds with at least the major portion of the liquid draining by gravity flow through said second fiber bed or at said interface.

Selection of fiber diameters and/or bed voidages as required above to provide mechanical stability of each bed and non-flooding collection of liquid is well within the ordinary skills of the art. In general, the smaller the mean fiber diameter the lower must be the bed voidage (i.e., the packing density must be higher). A mechanically stable bed is one which, for the purposes of this invention, will retain its structural integrity without substantial shifting of fibers in the bed during aerosol collection at the design operating conditions so as to significantly alter its performance characteristics from those designed for, or so as to cause matting of fibers in localized areas which would make such localized area of the bed relatively more resistant to the flow of liquid or gas.

The depth or thickness of each of the first and second fiber beds (i.e., their dimension in the plane parallel to the gas flow) is of no critical concern in the practice of this invention since the bulk of the aerosol collection is usually separated within the first inch or two of the first fiber bed, though beds up to 4 inches or more are commonly used for higher efficiency. Effective drainage from the second fiber bed can also be achieved with beds as small as about 0.5 inch (1.2 centimeters) though beds up to 2 or 3 inches (5.1 or 7.6 centimeters) or more may be satisfactorily used. The only limit on the maximum depth of each bed is the practical limitation of pressure drop through the bed. High pressure drop means high power requirements to move the gas. Thus, the bed depth or thickness is normally selected so as to provide minimum pressure drop commensurate with the collection efficiency desired and the fiber diameter and bed voidage used, all of which is well within the knowledge of those skilled in the art.

An understanding of residual saturation of a fiber bed and its effect upon operation of the fiber bed is essential to this invention.

Residual saturation is the maximum quantity of a given liquid which a given fiber bed will hold under given conditions without migration of the liquid from the fiber bed other than by evaporation. It will vary with the nature of the liquid, the nature of the fiber, the fiber diameter, the bed packing density (or void fraction), and it will vary in magnitude depending upon the condition under which it is measured.

This invention is concerned with residual saturation in the bed under two conditions; i.e., the residual saturation attained in the fiber bed against the force of the drag of the gas flowing through the bed at the intended design bed velocity (Rv), and the residual saturation attained in the bed against the force of gravity (Rg). It is helpful to visualize residual saturation under each condition (or force) as that maximum loading of liquid in the fiber bed at which the force applied to the liquid (i.e., gas drag in the one case, the gravity in the other case) just balances the resistive forces holding the liquid in the fiber bed. Although theoretically it may appear that Rv could never be greater than Rg, this invention and the test methods provided herein provide an empirical method for determining Rv while preventing gravity drainage and its effect on the test bed.

Residual saturation is in no way to be confused with a flooded or full fiber bed wherein the collected liquid substantially completely fills the void spaces between the fibers in the bed or in the flooded portion of a bed. Residual saturation in the fiber bed separators of this invention will occur at a liquid loading well below the flood stage and is more a function of capillary action and surface tension, rather than a filling of the available void space in the bed.

Thus, in the fiber bed separators and process of this invention, the first and second fiber beds are selected on the basis of the quantity flow rate (e.g., cubic feet per minute) of the gas to be treated; the nature, quantity and particle size distribution of the aerosol contained in the gas; and the desired collection efficiency, pressure drop and bed velocity in the following manner.

Under the design flow conditions, after bed operating equilibrium has been established, the liquid holdup in the first fiber bed (expressed, for example, as weight of liquid per unit weight of fiber in the bed, or, if desired, per unit bed volume) is insufficient to cause drainage from the first fiber bed by gravity, but is sufficient to allow gas drag to carry the collected liquid to the downstream surface of the first fiber bed. As used herein, bed operating equilibrium refers to the steady state condition achieved during actual collection of the aerosol where the quantity of aerosol entering the fiber bed is equal to the quantity of collected liquid leaving that fiber bed.

In the second fiber bed which substantially prevents re-entrainment of the collected liquid from the downstream surface of the first fiber bed, exactly the reverse relationship exists between residual saturation with respect to each of gas drag and gravity. Here, since the resistive forces against gravity drainage are less than the resistive forces against gas drag, the liquid drains down by gravity flow.

The practice of the present invention therefore eliminates any need for designing the fiber bed separator for operation at such low bed velocities that no re-entrainment occurs, or alternatively, eliminates the need for auxiliary downstream equipment to remove re-entrained particulates. Rather, this invention will permit greater flexibility in the design of a fiber bed separator for any given gas stream aerosol situation without undue concern about re-entrainment and will permit designing fiber bed elements and separators for operation at higher bed velocities than could otherwise be used.

DETERMINATION OF RESIDUAL SATURATION

For the purposes of this invention the following standardized test procedure is employed to determine residual saturation of a given fiber bed against each of gas flow drag and gravity.

After selection of the most desirable fiber material for use in the intended application following considerations well known to those skilled in the art, an approximation is made of the proper fiber diameter and packing density (i.e., within the 85 to 98% voidage range) of the first fiber bed using design parameters currently used in the art for fiber bed separators. Having established the ball park, residual saturation (against each of gravity and gas drag) data, and preferably a series of curves similar to those shown in FIG. 1, for such fiber(s) at varying packing densities can be determined using the following procedure and calculations.

A glass tube, about 10 inches (25.4 centimeters) long and of uniform inside diameter of about 1 inch (2.5 centimeters) is packed substantially uniformly to a bed depth of about 8 inches (20.3 centimeters) at a desired packing density with the desired fibers. The amount of fiber needed is determined by $$W = \frac{d^2 \times L \times Dp}{1251.7 \times Sf}$$

where:
W = Quantity of fiber required (grams)
d = Inside diameter of the glass tube (mm)
L = Length of the fiber bed (inches) of (0.394 × centimeters)
Dp = Packing density desired (pounds per cubic foot) or (16.02 × Kgm per cu. meter)
Sf = Specific gravity of the fiber material at 20° C The residual saturation of this fiber bed against gravity (Rg) is determined by placing the glass tube in a vertical position and slowly pouring the liquid under study (i.e., the aerosol to be separated in the intended application) on top of the fiber bed with a liquid head of at least 1 inch (2.54 centimeters). When drainage starts from the lower surface of the fiber bed, cease adding liquid and continue draining until no more liquid comes out of the bottom surface of the fiber bed. Measure the weight increase over the initial weight of the dry fiber (i.e., the quantity of liquid being held up on the fiber bed) and calculate the residual saturation against gravity:

$$Rg = K \times \frac{\Delta W_1}{W}$$

where:
Rg = Residual saturation (i.e., liquid holdup) against gravity (grams liquid per gram fiber)
$\Delta W_1$ = Weight increase; i.e., quantity of liquid held up in the fiber bed against gravity (grams)
W = Initial dry weight of the fiber (grams)
K = A Scale-down factor It should be noted that Rg is determined under static conditions; that is, without gas flow. Thus, Rg will be constant no matter what gas bed velocity is used in actual service.

The scale-down factor (K) is used to correct for dimensional limitations of small fiber beds such as the above. When drainage by gravity flow ceases, there is normally a small amount of residual liquid at the bottom of the fiber bed in addition to that held in the bed by Rg forces. Without further fibers to drain down on, surface tension tends to hold a small additional quantity of liquid on the fibers at and just above the bottom surface of the fiber bed in this Rg test. As the depth of the fiber bed through which gravity drainage occurs is increased and/or fiber diameter is increased, the effect of this additional capillary holdup becomes less and it becomes negligible in about 2 to 3 feet (0.6 to 0.9 meter) deep beds. If desired, one could use the deeper test bed, e.g., a 2 inch (5 centimeter) tube packed to a 36 inch (0.9 meters) bed depth, but beds of such 36 inch depth take such a long time to drain to equilibrium $R_g$ that one skilled in the art will normally wish to use a shallower bed such as the 8 inch (20.3 cm.) deep bed described above even though the correction factor may be needed.

The K factor for the 8 inch bed described above is readily determined as the ratio of the $R_g$ of a large test bed [for example, the 2 inch (5 cm.) diameter by 30 inch (76 cm.) long bed] to the $R_g$ of the smaller test bed for a given fiber diameter, packing density and liquid. Note that though a large test bed is required to determine the K factor, once determined for a given small test bed all further $R_g$ tests to determine the parameters for that system can be run on the smaller test bed.

Using untreated long staple glass fibers in the small 8 inch (20.3 cm.) test bed of this procedure, a K value of 0.86 was found suitable for mean fiber diameters in the range of from about 7 to 11 microns at packing densities of from about 10 to 16 pounds per cubic foot (160 to 256 Kilograms/cu. meter) when the liquid was water, sulfuric acid or dioctyl phthalate. A K value of 1.0 (in other words, no correction necessary) was found suitable for 30 micron curly glass fibers using these same liquids. Thus, it can be seen that once calculated for a given type of fiber, fiber diameter, packing density and type of liquid, the same K value will often be useful over a substantial range. It is, however, advisable to redetermine the K value whenever a different fiber material is to be used or a different liquid is to be used, or when a substantially different fiber diameter and/or packing density is intended.

Next, the residual saturation against gas drag ($R_v$) is determined. For this test, a glass tube about 6 inches (15 cm.) long and of uniform inside diaemter of about 1 inch (2.54 cm.) is packed with the same glass fibers to the same substantially uniform packing density with a bed depth (i.e., thickness) of about 3 inches (7.6 cm.). Here a shorter bed is preferably used for practical reasons since the pressure drop through thicker beds (e.g., the 8 inch bed used to determine Rg) would necessitate considerably higher power requirements and it would take inordinately long for $R_v$ equilibrium to be obtained. Since no correction factor for bed depth is involved in the $R_v$ determination, thinner test beds provide excellent measurements without the foregoing disadvantages.

The glass tube, with the fiber bed pre-saturated with the liquid, is placed in a horizontal position and an air supply with controllable flow rate is connected to one end of the tube. Further liquid is added to the glass tube such that a head of liquid forms over the upstream surface of the fiber bed until drainage occurs from the downstream surface. Liquid addition is then stopped.

The air stream is flowed through the fiber bed at a predetermined bed velocity until no further liquid leaves the downstream surface. Since residual saturation of the fiber bed against gas drag ($R_v$) usually decreases as bed velocity increases, it is desirable when determining the $R_v$ of a given fiber bed at a number of different bed velocities, to start with a low bed velocity for the first $R_v$ determination and work incrementally up to higher bed velocities.

$R_v$ is calculated for each bed velocity by measuring the weight increase over the initial weight of the dry fiber (i.e., the quantity of liquid being held up in the fiber bed) and using the following formula:

$$R_v = \Delta W_2/W$$

where:
  $R_v$ = Residual saturation (i.e., liquid holdup) against gas drag (grams liquid per gram fiber)
  $\Delta W_2$ = Weight increase; i.e., quantity of liquid held up in the fiber bed against gas drag (grams)
  $W$ = Initial dry weight of the fiber (grams)

In designing the fiber bed separator for a given application, it is helpful to generate a series of $R_g$ and $R_v$ data points for fiber beds of different bed voidages and fiber diameters and chart the results as shown in FIG. 1 to aid in proper fiber bed design.

The task of the practitioner in designing fiber bed separators according to this invention is greatly simplified since once the relationship between $R_g$ and $R_v$ has been determined, for example, by a graph such as FIG. 1, the actual magnitude of $R_g$ and $R_v$ at a given set of conditions becomes totally immaterial. The only consideration then is whether $R_g$ is greater or less than $R_v$. Thus, the $R_g$ and $R_v$ data may be experimentally developed using a safe liquid such as water or dioctyl phthalate and the results can be used for any liquid wherein the order of the $R_g$ to $R_v$ relationship is substantially the same, regardless of what the actual magnitudes of $R_g$ and $R_v$ may be at corresponding conditions.

ALTERNATIVE TEST METHOD FOR $R_v$ and $R_g$

The following alternative test method for determining $R_v$ and $R_g$ is particularly suited for use with relatively stiff fibers which are not readily packed into a tube with any degree of uniformity of packing density. Thus, this test method is preferred with 30 micron or larger fibers, particularly curly glass fibers, resin treated or coated glass fibers, wire mesh, spray catcher ("SC") fibers and other fibers of like stiffness, which are often used in the second fiber bed of the fiber bed separators of this invention, or as the first fiber bed in high velocity fiber bed separators of this invention.

To determine $R_g$, the residual saturation of the fiber bed against gravity drainage, a plurality of layers of the stiff test fibers are stacked as a flat fiber bed until when compressed between a pair of screens the desired packing density will be obtained. Advantageously, a fiber bed measuring 3 inches (7.6 cm.) wide by 4.5 inches (11.4 cm.) high by ⅜ inch (0.95 cm.) thick is formed. The fiber bed is immersed in the test liquid until the voids thereof are substantially full and then lifted out of the liquid and held vertically until liquid stops draining. $R_g$ is calculated as before using the same equation $$R_g = (\Delta W_1/W)$$

except that with stiff coarse fibers there is no need for scale-down factor K.

To determine $R_v$, the residual saturation of the fiber bed against gas drag, a flat fiber bed of test fibers is formed measuring ¾ inch (1.9 cm.) wide by 1 inch (2.54 cm.) high by 3 inches (7.6 cm.) thick. It will be noted that this fiber bed has a very small cross-sectional area which is most desirable when determining $R_v$. With the 3 inch thickness disposed horizontally, air is passed through the bed at a selected bed velocity. The test liquid is added at the upstream face of the fiber bed such that it is uniformly distributed over the upstream surface of the fiber bed (e.g., by spraying into the air stream) until drainage occurs from the downstream surface. Liquid addition is then stopped and the air is flowed through the fiber bed at the chosen bed velocity until no further liquid leaves the downstream surface. $R_v$ is calculated as before using the same equation $$R_v = (\Delta W_2/W)$$

DESCRIPTION OF THE PREFERRED EMBODIMENTS

Figure 1:
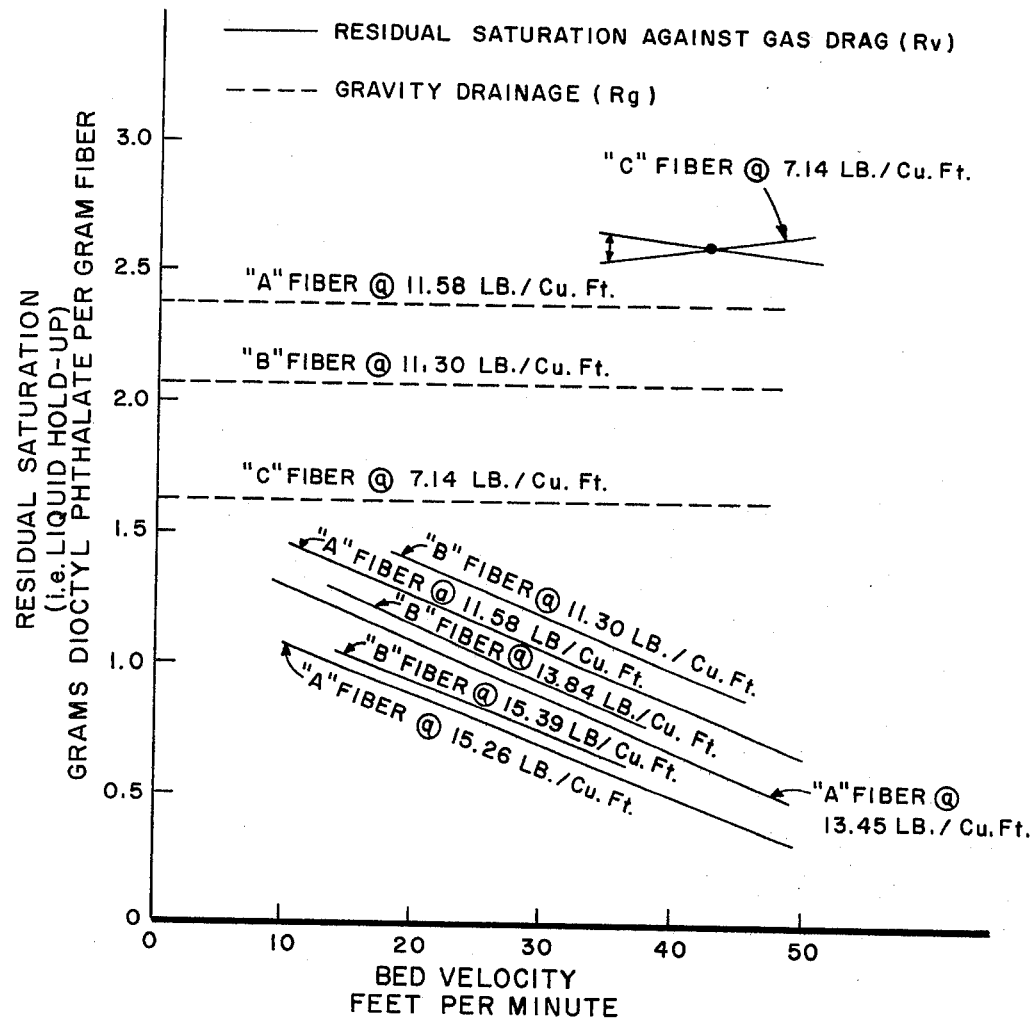
FIG. 1 is a graphic plot of residual saturation (both against gas drag and against gravity) versus gas bed velocities in the high efficiency separator range for each of 3 different fibers at varying packing densities (i.e., void fractions). It represents one embodiment of this invention.

FIG. 1 shows graphically the relationship between residual saturation (i.e., equilibrium liquid holdup) and gas bed velocities in the range of from 10 to 50 feet per minute, in the case of a dioctyl phthalate plasticizer mist or aerosol in air using untreated hydrophilic type glass fibers at various bed void fractions (i.e., packing densities).

It has been found that the $R_v$ to $R_g$ relationships found in FIG. 1 for dioctyl phthalate (specific gravity 0.9) are fully applicable to sulfuric acid (specific gravity 1.5) and water with only minor shifts in the relative positions of the curves when the absolute values of $R_g$ and $R_v$ for the different liquids are disregarded. It is recommended that when any new liquid application or fiber material are to be designed for, one should run at least a few $R_g$ and $R_v$ determinations for the new systems to be sure that any data developed for other systems will be suitable for use. Note also that if design parameters are chosen such that in any one fiber bed $R_g$ will be close to $R_v$ in magnitude, it is desirable to generate new data rather than rely on a general relationship with data for other systems.

Since this invention is applicable to fiber bed separators without regard to the nature of the fiber material, discussion of the packing density of the fiber bed is only meaningful in the generic sense in terms of the void fraction of the bed (i.e., % bed voidage). Once the fiber material to be used has been established, however, and its specific gravity or density is known, it becomes more useful to refer to the packing density in terms of weight of fiber per unit volume of bed such as pounds per cubic foot or grams per cubic centimeter. Conversion between void fraction and packing density in either English or Metric system is accomplished using the following equation:

$$V\% = \frac{D_f - D_p}{D_f} \times 100$$

wherein V% = percent voidage, $D_f$ = density of the fiber material, and $D_p$ = packing density.

This equation can be used to equate the packing densities of the various glass fibers shown in FIG. 1 on the basis of the glass having a specific gravity of, for example, 2.55 which corresponds to a glass density ($D_f$) of about 159 pounds per cubic foot (2.54 gms. per cu. cm.).

Untreated chemically resistant glass fibers of three different nominal fiber diameters were used to generate the data shown in FIG. 1. Each bed is of fibers of rather uniform fiber diameter, 95% or more of the fibers having a diameter within ± 2 microns of the nominal fiber diameter. "A" fiber is a long staple glass fiber having a nominal fiber diameter of 7.6 microns, "B" fiber is a long staple glass fiber of 10.5 microns, and "C" fiber is a curly glass fiber of 30 microns.

As can be seen from FIG. 1, prepared using the first test method described above, at the low bed velocities shown, beds of A and B fibers at the packing densities shown have an $R_v$ which is less than $R_g$ when dioctyl phthalate (or water or sulfuric acid) is the liquid being collected. Thus, in practice of this invention for recovery of any of these aerosols, either A or B fiber can be used in the first fiber bed at any packing density where under the desired bed velocity conditions $R_v$ is less than $R_g$. FIG. 1 further shows that neither A fiber nor B fiber would be suitable for the second fiber bed at any of the packing densities shown.

Beds of C fiber, however, at the 7.14 pound per cubic foot (114.4 kilogram per cu. meter) packing density, have an $R_v$ greater than $R_g$ for aerosols of any of these liquids at these low bed velocities. Thus, FIG. 1 shows that C fiber at a low packing density would make an excellent second fiber bed in the fiber bed separators in this invention for recovery of any of these aerosol liquids at bed velocities of about 30 to 50 feet per minute (9 to 15.2 meters per minute) or more, without significant re-entrainment.

Experimental extension of the $R_v$ curve for each given fiber bed and liquid combination beyond the bed velocity ranges shown in FIG. 1 will show that such $R_v$ curves are not necessarily linear over broad ranges of bed velocity. As bed velocity is changed, the relationship between $R_v$ and $R_g$ for that fiber bed will change and can be measured according to the test procedure set forth above if the intended design parameters for the fiber bed so require. Thus, one cannot simply extrapolate any of the $R_v$ curves shown in FIG. 1 beyond the 10 to 50 feet per minute (3.05 to 15.2 meters per minute) bed velocity range shown in FIG. 1.

FIG. 7 is similar to FIG. 1 except that it shows the relationship at higher velocities, i.e., from 100 to 600 feet per minute (30.5 to 183 meters per minute), of $R_v$ and $R_g$ for three rather coarse and stiff fibers using water and a 0.1 weight % aqueous solution of Sterox DJ detergent as the test liquids. FIG. 7 is prepared using the alternative test method described above for stiff fibers.

In FIG. 7, the "C" fiber is the same 30 micron curly glass fiber discussed above. The "SC" fiber is a 200 micron mean diameter straight (or needle-like) glass fiber. The treated "C" fiber is one coated with dimethyldichlorosilane to make it hydrophobic.

From FIG. 7 is can be seen that, for example, with a fiber bed of "C" fibers packed to a density of 7.14 pounds per cubic foot (114.4 kilograms per cu. meter) when water is the liquid being separated, $R_v$ is greater than $R_g$ at bed velocities up to about 330 feet per minute (100 meters per minute) and thus suitable as the second fiber bed at any bed velocity up to about 330 and preferably below 300, feet per minute (100, and preferably below 91 meters per minute) for collecting water mists or sprays. At bed velocities above about 330 and preferably above 350, feet per minute (100, and preferably above 106.7 meters per minute) this particular fiber bed would be suitable for the first fiber bed (but not the second) in such applications.

It can also be seen from FIG. 7, that the hydrophobic "C" fiber treated with dimethyldichlorosilane, packed to the same 7.14 pound per cubic foot (114.4 kgm per cu. meter) density, has a lower $R_v$ and $R_g$, but would be suitable for water separation as the second fiber bed at bed velocities up to about 180, and preferably below 160, feet per minute (54.9 and preferably below 48.8 meters per minute). At bed velocities above 180 and preferably above 210 feet per minute. (54.9 and preferably above 64 meters per minute), this fiber bed would be suitable for the first fiber bed (but not the second) in such applications.

The curves in FIG. 7 for the 0.1% aqueous Sterox DJ detergent solution in the untreated and silane treated "C" fiber beds illustrate the practice of this invention for removal of a low surface tension liquid from a gas stream. For example, a suitable fiber bed separator could be designed for removal of this liquid using a bed velocity above about 120, and preferably above 150, feet per minute (36.6, and preferably above 45.7 meters per minute), using the untreated "C" fiber in the first bed at a packing density of 7.14 lbs per cu. ft. (114.4 kgm. per cu. meter) or for even lower bed velocities using the treated "C" fiber at this 7.14 lbs per cu. ft. packing density. Untreated "SC" fibers at 5.7 lbs. per cu. ft. (91.3 kgm. per cu. meter) would predictably be suitable for the second fiber bed.

From the foregoing description, coupled with the heretofore described methods for determining $R_v$ and $R_g$, data and charts similar to FIGS. 1 and 7 can easily be prepared by those skilled in the art for any combination of aerosol, gas flow volume and bed velocity, fiber type, fiber diameter and packing density (i.e., voidage percentage).

This invention is equally applicable to the separation of soluble solid aerosols from gases where a liquid (e.g., water in the case of water soluble solids) is used either to irrigate the first fiber bed or is injected into the gas stream as a fog or mist prior to the first fiber bed. In such instances, the liquid collected is a solution of the solids in the solute chosen. A solution of the same concentration and characteristics would be used as the liquid in the test procedure (supra) for calculating $R_v$ and $R_g$ values.

In designing high efficiency separators, the principles of this invention can be applied to any type of fiber of any diameter up to about 20 microns mean diameter for the first fiber bed and larger for the second fiber bed. For practical considerations, the fibers used in the first fiber bed should be at least 5 micron mean diameter since beds of finer fibers lack the mechanical stability necessary to stand up to the internal forces within the fiber bed during operation without matting or felting, or shifting so as to result in lower packing density areas permitting channeling of the gas and causing loss of efficiency.

The fibers themselves should not absorb the liquid to any substantial degree. Suitable fiber materials include, for example, metals such as stainless steel, titanium, etc.; fibers of polymeric materials such as polyesters, polyvinylchloride, polyethylene terephthalate, fluorocarbons such as Teflon, nylons, polyalkylenes such as polyethylene and polypropylene, etc., and glass. Glass fibers have found particularly widespread use in fiber bed separators and are preferred for use as the first fiber bed in the practice of this invention. Suitable glass fibers and fiber beds include both coated and uncoated or untreated glass fibers. Glass fibers coated with a material providing lyophobic properties, and particularly the silicone coated hydrophobic glass fibers taught in U.S. Pat. No. 3,107,986, may be used. However, in an especially preferred embodiment untreated lyophilic, and particularly hydrophilic, glass fibers are used. Especially useful glass fibers are long staple glass fibers in diameters up to about 20 microns, and larger 25 micron or greater curly glass fibers, all of which provide fiber beds of excellent mechanical stability at the low packing densities used to obtain the desired bed voidage. If desired, such fiber beds can be heat treated to relieve stresses from packing or forming the bed and to provide additional mechanical stability.

The fiber bed separators of this invention can be designed for either high efficiency or high bed velocity applications. High efficiency elements are normally used where environmental or process requirements require virtually complete removal of aerosol particles in the sub-micron to 3 micron size range. Collection of such aerosol particles at efficiencies up to 99.9% can be achieved in the elements of this invention at bed velocities up to about 100, and preferably 70, feet per minute (30.5, and preferably 21.3, meters per minute) with substantially no re-entrainment. In any event, this invention allows the design of high efficiency elements and separators for bed velocities considerably higher than the 40 to 50 feet per minute (12.2 to 15.2 meters per minute) upper limit currently used in the design of high efficiency separators for usual aerosol loadings.

Fibers having a mean diameter of from about 5 to 20 microns are used in the first fiber bed of such high efficiency separators. Long staple glass fibers of from about 7 to 12 microns mean diameter are especially preferred for an excellent balance between mechanical stability of the bed and collection efficiency. The fibers used in the second fiber bed will usually be of at least the same mean diameter as those used in the first fiber bed, but preferably will be of larger mean diameter such that, at the required packing density, mechanically stable beds are obtained with the proper $R_v$ to $R_g$ relationship. Fibers of from about 15 to 75 microns mean diameter are preferred for the second fiber bed, and preferably curly glass fibers of from about 25 to 35 microns. When such curly glass fibers are used, packing densities of from about 5 to 15, and preferably 5 to 10, pounds per cubic foot (80 to 240, and preferably 80 to 160, kilograms per cu. meter) have been found most suitable for such second fiber bed. In such preferred embodiments the second fiber bed will be of more open structure (i.e., higher percent voidage) than the first fiber bed to minimize further pressure drop through this second bed, and will provide excellent liquid phase drainage.

Higher bed velocity separators are effective (normally 85 to 95% collection efficiency) when the aerosol characteristics are such that only the 1 to 3 micron and larger aerosol particulates are of concern and are such that collection by the impaction mechanism is suitable. In such cases, and particularly when large volumes of gas require treating, larger diameter fibers packed to bed voidages of from 85 to 99% provide adequate separation without high pressure drops. Such separators are typically designed to operate at bed velocities of from about 300 to 500 feet per minute (91 to 152.4 meters per minute). Since the upper limit of bed velocity used is often set by re-entrainment problems, the practice of the present invention will permit extension of the use of high velocity separators to even higher bed velocities, e.g., 700 to 800 feet per minute (213.4 to 243.8 meters per minute) or greater.

Generally, high velocity separators will use fibers of from about 25 to 75 microns mean diameter in the first fiber bed. Glass fibers, and particularly curly glass fibers, are preferred at packing densities of from about 3 to 15, and preferably 5 to 10, pounds per cubic foot (48.1 to 240, and preferably 80 to 160, kilograms per cu. meter). The fibers used in the second fiber bed are selected using the same criteria as described above for the high efficiency separators. Fibers of from about 30 to 300 microns mean diameter are preferred.

Fiber bed separators for use at bed velocities intermediate of the foregoing ranges for high efficiency and high velocity separators can be designed according to the teachings of this invention for appropriate applications to obtain any desired balance between collection efficiency and volume of gas to be treated.

Figures 2, 3, 4:
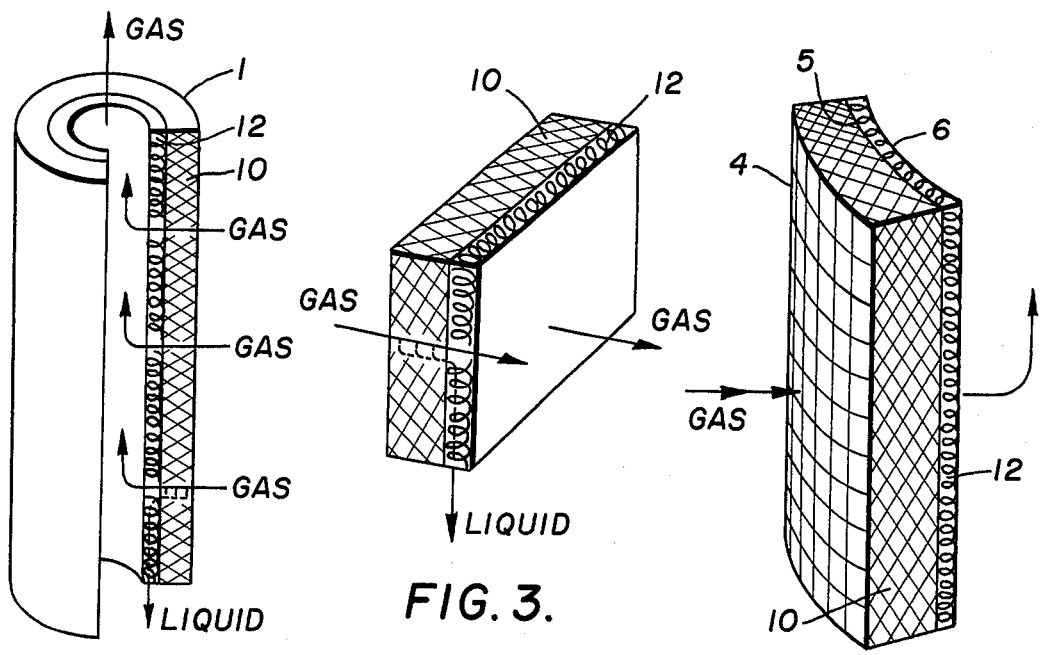
FIG. 2 is a perspective view, partly cut away, of a cylindrical fiber bed element which is a preferred embodiment of this invention. Support screens have been omitted from FIG. 2 for clarity.
FIG. 3 is a perspective view of a flat fiber bed element which is another preferred embodiment of this invention.
FIG. 4 is a cut-away segment of a cylindrical fiber bed element as in FIG. 2, but with suitable support screens in place.

Various embodiments of this invention are shown in FIGS. 2 and 3 wherein two preferred types of fiber bed element are shown. FIG. 4 shows a cut-away portion of a cylindrical element.

As can be seen in these Figures, the first and second fiber beds are in intimate contact with one another. Suitable rigid, open network, supports such as wire mesh screens 4 and 6 of FIG. 4 stabilize the first and second beds (10 and 12, respectively) of the element. Since these beds will normally be of different packing densities another support screen 5 may be interposed between the two fiber beds. Support screen 5 will not be needed in those instances where either or both of the fiber beds has sufficient mechanical stability without such screen support such that the mechanical stability of the other bed will not be disturbed. Fiberglas reinforced polyesters also are excellent as support screens. This invention is not intended, however, to be limited in any way by the type of support means used since its only function is to hold the fiber beds without significantly interfering with gas flow.

The term "intimate contact between the two fiber beds" is intended herein to mean substantial fiber to fiber contact between fibers of the first bed and fibers of the second bed over substantially the entire interfacial area between the two beds. Thus, collected liquid flowing to the downstream surface of the first fiber bed contacts the fibers of the second fiber bed at the interface and then drains from the second bed. Thus, drainage begins at the interface and may continue along the interface or within the second fiber bed, depending upon gas drag and gravity effects in the second fiber bed and the path of least resistance.

FIGS. 2, 3 and 4 show the vertical positioning of the two fiber beds and the horizontal gas flow. In actual practice, neither the elements nor the gas flow need be totally vertical nor horizontal, respectively. In fact, gas flow in actual operation can vary substantially from the horizontal just so long as the general direction of gas flow is from the upstream surface of the element through to the downstream surface thereof (herein called "substantially horizontal"). It will also be obvious to those skilled in the art that the fiber bed elements need only be disposed substantially vertically without seriously affecting the practice of this invention.

Cylindrical fiber bed elements of the type shown in FIG. 2 can be used in any application wherein cylindrical elements are normally used. They are particularly useful in separators where high first fiber bed surface area is needed since they permit a high effective fiber bed surface in a minimum of vessel space. Flat fiber bed elements such as shown in FIG. 3, on the other hand, find particular application in high velocity fiber bed separators.

Installation of fiber bed elements in separating equipment is well-known in the art and is no different with respect to those of this invention. For example, cylindrical elements are normally constructed using rigid screens suitably affixed one to the other in rigid annular relationship with the fiber beds packed between the screens. One end of the element is closed against gas flow by a suitable plate and the other open end is mounted in a tube-sheet with suitable flanges. Normally, a plurality of elements are similarly mounted in the tube sheet. Depending on the desired direction of gas flow, the elements may be installed in the vessel either suspended from the tube sheet or they may extend upwardly from the tube sheet. Gas inlet means are provided to the vessel on the upstream side of the tube sheet and gas outlet means are provided on the downstream side of the tube sheet. With various permutations, the gas may be caused to flow either from the outer circumference of each element inwardly to the core thereof as shown in FIG. 2, or from the core of the element outwardly to the outer circumference thereof. Obviously, whichever gas flow direction is chosen, the first fiber bed will be disposed on the upstream side of the second fiber bed.

Figure 5:
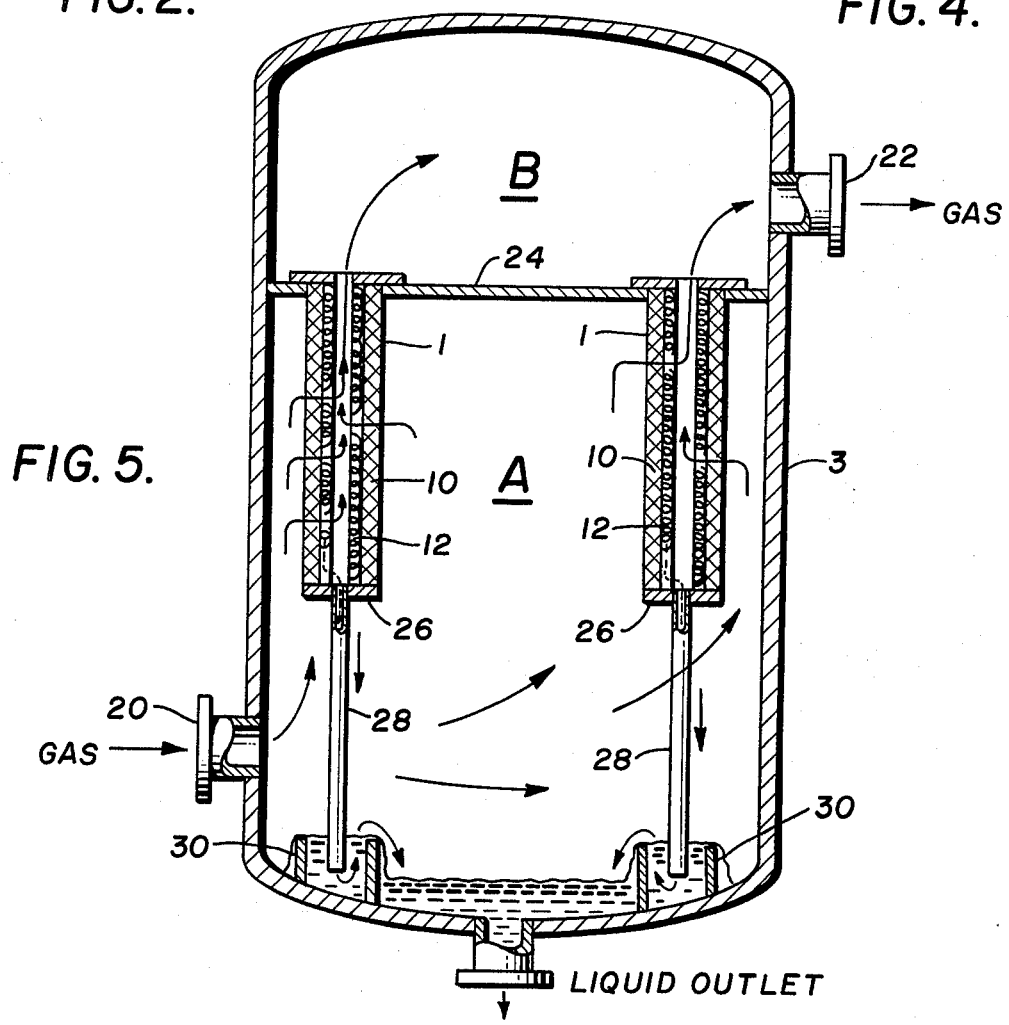
FIG. 5 is a cross-sectional view of one type of fiber bed separator which is a preferred embodiment of this invention.

One embodiment of cylindrical elements installed in a typical separator is shown in FIG. 5 wherein a fiber bed separator is shown consisting of a vessel 3 provided with gas inlet and outlet means, 20 and 22, respectively, and a plurality of cylindrical elements 1 suspended from tube sheet 24 with their open ends mounted in the tube sheet 24. The opposite end of each element is closed off against gas entering the core thereof from Zone A by plate 26 provided with a liquid drain pipe 28 extending to a suitable seal-pot 30 in the bottom of vessel 3.

In operation of the embodiment shown in FIG. 5, aerosol containing gas enters Zone A of vessel 3 through inlet 20. Since the lower end of each element 1 is sealed by plate 26, the gas cannot simply pass up the hollow cores of the elements but instead is forced to flow through the first fiber bed 10 and then the second fiber bed 12 as shown by the arrows. The gas, now substantially free of aerosol and without re-entrained liquid flows up to the hollow core of each element into Zone B of the vessel and out through outlet 22.

In each element, the aerosol is separated from the gas in the first fiber bed 10 and drains down through the second fiber bed 12 to bottom plate 26 and then down through drainpipe 28 to seal-pot 30.

WORKING EXAMPLES

The following examples illustrate results obtained in application of the present invention to separation of sulfuric acid mists or aerosols. For comparative purposes, examples are also included to show performance of the first fiber bed alone, i.e., without the second fiber bed, and the downstream loading of re-entrained particles are compared.

In each of Examples 1 to 8 tabulated in Table A, the first fiber bed is a two inch (5.08 cm.) thick bed of B fibers (i.e., long staple, untreated glass fibers of 10.5 micron nominal diameter) packed to a packing density of about 15.7 pounds per cubic foot (251.5 kilograms per cu. meter), i.e., about 90% bed voidage as a cylindrical element 12 inches (30.48 cm.) in outer diameter by 42 inches (106.7 cm.) long. The second fiber bed, when used, is a ¾ inch (1.9 cm.) thick bed of C fibers (i.e., untreated, curly glass fibers of about 30 micron nominal diameter) packed to a packing density of about 7.0 pounds per cubic foot (112.1 kilograms per cu. meter), i.e., about 95.6% bed voidage positioned inside the core of the cylindrical element in intimate contact with the inner circumference of the first fiber bed. $R_v$ and $R_g$ were determined using the first test method described above.

Figure 6:
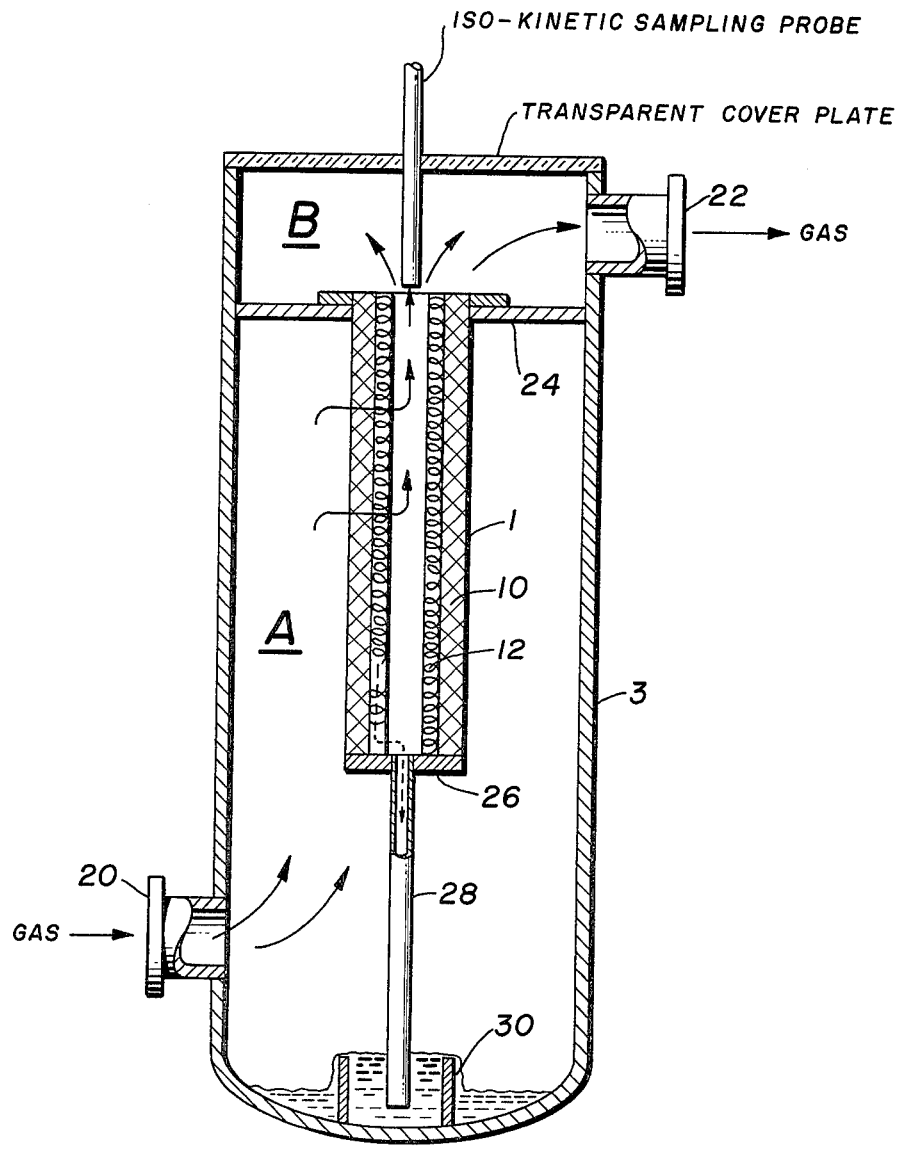
FIG. 6 is a cross-sectional view of a test fiber bed separator used to demonstrate the effectiveness of the present invention.
Figure 7:
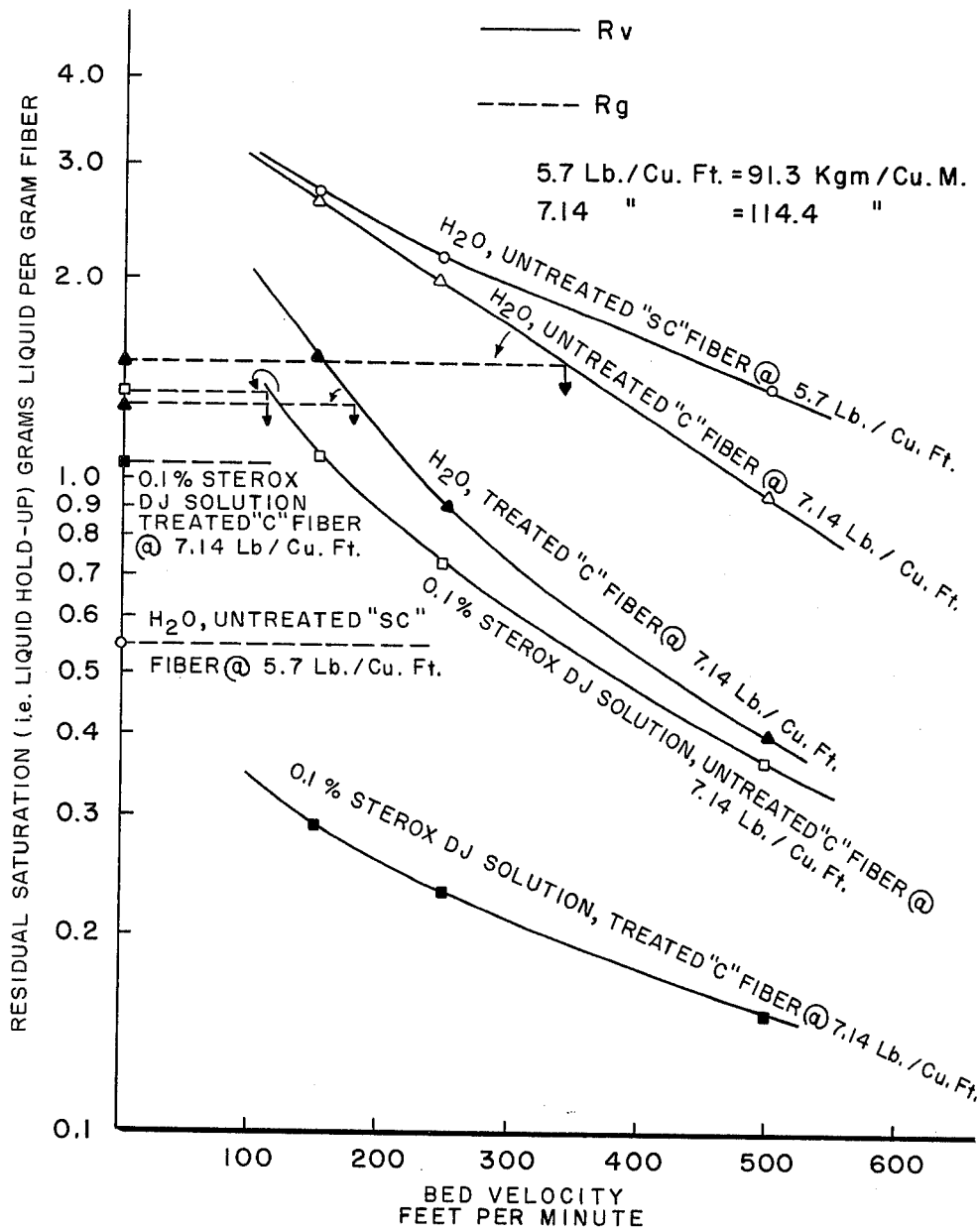
FIG. 7 is a graphic plot of residual saturation (both $R_v$ and $R_g$) versus gas bed velocities in the high velocity separator range for a variety of stiff, coarse fibers and two different liquids.

FIG. 6 shows the installation of a single element in a suitable test separator. An element having both the first and second fiber beds is shown in FIG. 6. The comparative element having only the first fiber bed and no second bed appears exactly the same, omitting, of course, the second bed.

The separator of FIG. 6 is connected to a suitable mist generator adapted to provide varying gas flow rates, generating sulfuric acid mist in air. For each run shown in the following data, target conditions were about 40 feet per minute (12.2 meters per minute) bed velocity using about 55% conc. sulfuric acid to an inlet mist loading of about 70 milligram per actual cubic foot (2.47 grams per Actual Cu. Meter) of air with a mass mean particle size of about 1.0 microns.

Exit mist samples were taken from the center of the core of the element with an iso-kinetic probe and a Monsanto Enviro-Chem Systems, Inc. BMS-10 mist sampler. The results are tabulated in Table A.

TABLE A

| Example No. | Second Bed Used | Particle Size | Bed Velocity | | Re-entrainment (55% Acid Basis) | |
|---|---|---|---|---|---|---|
| | | | Ft/Min. | (M/Min) | mg/ACF | (mg/ACM) |
| 1 | None | 0.98μ | 41.12 | (12.53) | 0.439 | (15.51) |
| | | | | | 2.558 | (90.37) |
| 2 | None | 0.97μ | 41.98 | (12.8) | 0.752 | (26.57) |

TABLE A-continued

| Example No. | Second Bed Used | Particle Size | Bed Velocity Ft/Min. | (M/Min) | Re-entrainment (55% Acid Basis) mg/ACF | (mg/ACM) |
|---|---|---|---|---|---|---|
| 3 | None | 1.0μ | 42.26 | (12.98) | 0.762 | (26.92) |
|   |      |      |       |         | 1.023 | (36.14) |
| 4 | None | 1.0μ | 41.92 | (12.78) | 0.780 | (27.56) |
|   |      |      |       |         | 0.561 | (19.82) |
| 5 | None | 1.2μ | 41.87 | (12.76) | 0.364 | (12.86) |
|   |      |      |       |         | 1.175 | (41.51) |
| 6 | Yes  | 1.0μ | 39.58 | (12.06) | 0.133 | (4.70) |
|   |      |      |       |         | 0.086 | (3.04) |
| 7 | Yes  | 1.0μ | 41.26 | (12.58) | 0.096 | (3.39) |
|   |      |      |       |         | 0.073 | (2.58) |
| 8 | Yes  | 1.2μ | 40.89 | (12.46) | 0.090 | (3.18) |
|   |      |      |       |         | 0.040 | (1.41) |
|   |      |      |       |         | 0.060 | (2.12) |

Where more than one re-entrainment value is shown in the above data it signifies that a subsequent core sample was taken. The re-entrainment values shown represent the larger particulates collected in the probe and the cyclone of the BMS-10 mist sampler, which are generally believed to be the particles 2 or 3 microns in size and larger.

Examples 1 through 5 were performed without the second fiber bed and show the high levels of re-entrainment occurring from the first fiber bed when no second fiber bed was used even through the design parameters of the present invention are followed for the first fiber bed, at bed velocities about the maximum current commercial practice finds desirable for high effeciency separators. When all of the data of examples 1-5 are averaged, it can be seen that the average level of re-entrainment for this fiber bed under these conditions was about 0.935 mg per actual cubic foot (33.07 mg. per actual cu. meter).

Examples 6 through 8, however, represent the practice of this invention using the second fiber bed. In this instance, averaging of the data shows that the average level of re-entrainment has been reduced to about 0.083 mg per actual cubic foot (2.93 mg per ACM). With such low levels of re-entrainment at the approximately 40 feet per minute (12.2 meters per minute) bed velocities shown, it is apparent that substantially higher bed velocities can be used before re-entrainment would again become a problem.

The following examples 9 to 14 further illustrate the reduction in re-entrainment obtainable through practice of this invention using a variety of fiber beds of both high efficiency and high velocity design, using the same 55% sulfuric acid and mist generator as used in Examples 1-8 above. Each of Examples 9-14 used a flat fiber bed as in FIG. 3 (but without a second bed in the first, control run of each example) having a flow surface area of 8 9/16 inches by 8 9/16 inches (21.75 by 21.75 cm) with bed thickness as shown in Table B, infra. The C fibers used are the same fibers as used in Examples 1-8. The SC fibers are uncoated straight glass fibers of about 200 microns nominal diameter; the A fibers are long staple uncoated glass fibers of 7.6 microns nominal diameter; at $A_f$ fibers are A fibers treated with dimethyldichlorosilane to provide a hydrophobic coated fiber; and the WM is wire mesh of wire fibers of about 178 microns nominal diameter. In each Example 9-14, the first run is a control for comparative purposes showing the high re-entrainment resulting when only the first fiber bed is used at bed velocities where $R_v$ is less than $R_g$, and the remaining runs show how the use of the second bed where $R_v$ is greater than $R_g$ provides a major reduction in re-entrainment. The re-entrainment data in Table B is based upon re-entrained particles greater than 3 microns in average particle size captured in the isokinetic sampling probe downstream of the flat bed element.

TABLE B

| Ex. | Run No. | First Fibert Bed | | | Second Fiber Bed | | | Inlet Mist* | | Bed Velocity Ft/Min (M/Min) | Re-entrainment (55% Acid Basis) mg/ACF (mg/ACM) |
|---|---|---|---|---|---|---|---|---|---|---|---|
| | | Fiber | Thickness Inch (Cm) | Packing Density Lbs/Cu.Ft. | Fiber | Thickness Inch (Cm) | Packing Density Lbs/Cu.Ft. (Kgm/Cu.M) | Loading mg/ACF (Gms/ACM) | Particle Size (Microns) | | |
| 9 | 1 | A | 2 (5.1) | 12.7 (203.5) | None | — | — | 36.3 (1.28) | 0.3 | 45.2 (13.8) | 3.42 (120.83) |
|   | 2 | A | 2 (5.1) | 12.7 (203.5) | C | 1 (2.54) | 7.1 (113.7) | 36.3 (1.28) | 0.3 | 45.2 (13.8) | 0.07 (2.47) |
| 10 | 1 | A | 1 (2.54) | 11.7 (187.4) | None | — | — | 35.9 (1.27) | 0.58 | 63.3 (19.3) | 1.20 (42.40) |
|   | 2 | A | 1 (2.54) | 11.7 (187.4) | C | 1 (2.54) | 7.1 (113.7) | 41.4 (1.46) | 0.64 | 65.7 (20.0) | 0.24 (8.48) |
| 11 | 1 | A | 1 (2.54) | 11.7 (187.4) | None | — | — | 77.1 (2.72) | 0.68 | 83.2 (25.4) | 1.1+ (38.9+)** |
|   | 2 | A | 1 (2.54) | 11.7 (187.4) | C | 1 (2.54) | 7.1 (113.7) | 76.8 (2.71) | 0.72 | 83.6 (25.5) | 0.16 (5.65) |
| 12 | 1 | C | 1 (2.54) | 7.1 (113.7) | None | — | — | 16.3 (0.58) | 3.0 | 504 (153.6) | 0.67 (23.67) |
|   | 2 | C | 1 (2.54) | 7.1 (113.7) | SC | 1 (254) | 4.4 (70.5) | 19.6 (0.69) | 3.0 | 506 (154.2) | 0.05 (1.77) |
|   | 1 | C | 1 (2.54) | 7.1 (113.7) | None | — | — | 16.2 (0.57) | 2.6 | 794 (242.0) | 4.45 (157.22) |
| 13 | 2 | C | 1 (2.54) | 7.1 (113.7) | SC | 1 (2.54) | 4.4 (70.5) | 16.4 (0.58) | 2.4 | 800 (243.8) | 0.05 (1.77) |
|   | 3 | C | 1 (2.54) | 7.1 (113.7) | WM | 1 (2.54) | 12.2 (195.4) | 28.1 (0.99) | 1.4 | 711 (216.7) | 0.13 (4.59) |
|   | 4 | C | 1 (2.54) | 7.1 (113.7) | WM | 1 (2.54) | 12.2 (195.4) | 27.3 (0.96) | 1.3 | 504 (153.6) | 0.20 (7.01) |

TABLE B-continued

| Ex. | Run No. | First Fibert Bed | | | Second Fiber Bed | | | Inlet Mist* | | | Re-entrainment (55% Acid Basis) mg/ACF (mg/ACM) |
|---|---|---|---|---|---|---|---|---|---|---|---|
| | | Fiber | Thickness Inch (Cm) | Packing Density Lbs/Cu.Ft. | Fiber | Thickness Inch (Cm) | Packing Density Lbs/Cu.Ft. (Kgm/Cu.-M) | Loading mg/ACF (Gms/ACM) | Particle Size (Microns) | Bed Velocity Ft/Min (M/Min) | |
| 14 | 1 | $A_T$ | 1 (2.54) | 11.7 (187.4) | None | — | — | 43.2 (1.53) | 0.60 | 61.6 (18.8) | 1.36 (48.05) |
| | 2 | $A_T$ | 1 (2.54) | 11.7 (187.4) | C | 1 (2.54) | 7.1 (113.7) | 41.2 (1.46) | 0.60 | 62.6 (19.1) | 0.13 (4.59) |

*Note:
The metric units given for the inlet mist loading are in Grams per Actual Cubic Meter whereas those for re-entrainment are in Milligrams per Accual Cubic Meter.
**Note:
In the first run of Example 11, some of the re-entrainment was lose.

In each instance in Examples 9–14 the composite fiber beds of this invention provided a significantly higher collection efficiency of the sulfuric acid mist from the air stream as compared to the first, or control, run in each example wherein only a single (i.e., the first) fiber bed was used. Moreover, the composite fiber beds of this invention did not have a significantly higher pressure drop through the composite bed than through only the first fiber bed used in the first, or control, run of each example.

This invention is not limited in the form of the fibers used in the first and second fiber beds. These two fiber beds may be independently formed using bulk fibers, sheets or mats of fibers, fiber roving, etc. For example, a single mat of fibers may be compressed to the desired packing density or a plurality of sheets of like fibers may be layered to form one of the fiber beds. In other embodiments, e.g., a long continuous sheet of fibers, or long continuous fiber roving may be spirally wound around a cylindrical foraminous core. In such embodiments, proper tension during winding can be used to provide an upstream higher packing density zone where $R_v$ is less than $R_g$ (i.e., a first fiber bed zone) and a downstream lower packing density zone where $R_v$ is greater than $R_g$ (i.e., a second fiber bed zone), with the upstream first fiber bed zone being at the core of the cylinder or at the outer circumference of the wound element, as desired.

The foregoing description of the several embodiments of this invention is not intended as limiting of the invention. As will be apparent to those skilled in the art the inventive concept set forth herein can find many applications in the art of fiber bed separations and many variations on and modifications to the embodiments described above may be made without departure from the spirit and scope of this invention.

What is claimed is:

1. In a process for removing aerosols of less than 3 microns from a moving gas stream in a fiber bed separator wherein said aerosol containing gas is caused to flow substantially horizontally through a substantially vertical non-matting bed of randomly distributed fibers having a mean diameter of at least about 5 microns and packed to a substantially uniform bed voidage of from about 85 to 98%, resulting in separation of a substantial proportion of the aerosol from the gas as a collected liquid phase, an improvement whereby re-entrainment of said liquid phase from the downstream surface of said fiber bed is substantially prevented, said improvement comprising:

(a) providing a second fiber bed in intimate fiber to fiber contact with said substantially vertical non-matting bed of randomly distributed fibers, hereinafter referred to as said first fiber bed, such that an interface is formed between said first and second fiber beds, (b) causing said aerosol containing gas to flow through said first fiber bed under non-flooding conditions for the aerosol loading contained in said gas, said first fiber bed being selected such that the residual saturation of said first fiber bed against gas phase drag of the liquid phase is less than the residual saturation of said first fiber bed against gravity drainage of the liquid phase, (c) continuing the substantially horizontal flow of said gas, now substantially free of aerosol particles, through said second fiber bed, said second fiber bed being a substantially vertical non-matting bed of randomly distributed fibers packed to a bed voidage of from about 85 to 99%, the mean fiber diameter and voidage of said second fiber bed being selected such that the residual saturation of said second fiber bed against gas phase drag of the liquid phase is greater than the residual saturation of said second fiber bed against gravity drainage of the liquid phase, and (d) continuously draining the collected liquid phase from said interface between said first and second fiber beds such that the liquid drains by gravity flow through said second fiber bed or at said interface.

2. An improved process as in claim 1 for separation of aerosols from gases with high efficiency, wherein the fibers of said first fiber bed have a mean diameter of from about 5 to 20 microns and wherein the fibers of said second fiber bed have a mean diameter of from about 25 to 35 microns.

3. An improved process as in claim 2 wherein the fibers of said first fiber bed are glass fibers packed to a bed density of from about 5 to 20 pounds per cubic foot.

4. An improved process as in claim 3 wherein the fibers of said first fiber bed are untreated hydrophilic long staple glass fibers of substantially uniform fiber diameter of from about 7 to 12 microns packed to a bed density of from about 10 to 16 pounds per cubic foot.

5. An improved process as in claim 1 for separation of aerosols from gases at high bed velocity wherein the fibers of said first fiber bed have a mean diameter of from about 25 to 75 microns and wherein the fibers of said second fiber bed have a mean diameter of from about 30 to 300 microns and are equal to or larger than the mean diameter of the fibers of said first fiber bed.

6. An improved process as in claim 5 wherein the fibers of said first fiber bed are glass fibers packed to a bed density of from about 3 to 15 pounds per cubic foot.

7. An improved process as in claim 6 wherein the fibers of said first fiber bed are untreated hydrophilic curly glass fibers of substantially uniform fiber diameter of from about 25 to 35 microns packed to a bed density of from about 5 to 10 pounds per cubic foot.

8. A fiber bed separator for removal of aerosols of less than 3 microns from a moving gas stream as a liquid phase without substantial re-entrainment of the collected liquid phase, comprising inlet means for the aerosol containing gas, at least one fiber bed element disposed in a substantially vertical position, outlet means for the collected liquid phase, outlet means for the treated gas stream, and baffle means forcing the aerosol containing gas stream to pass through each of said at least one fiber bed elements; each of said at least one fiber bed elements comprising, in the direction of gas flow therethrough:
  (a) a first fiber bed and a second fiber bed in intimate fiber to fiber contact with each other such that an interface is formed between said first and second fiber beds,
  (b) said first fiber bed being a non-matting bed of randomly distributed fibers having a mean fiber diameter of at least about 5 microns packed to a substantially uniform bed voidage of from about 85 to 98%, said mean fiber diameter and said bed voidage being selected such that at design gas velocity and aerosol loading said first fiber bed will not flood with collected liquid phase and the residual satuaration of said first fiber bed against gas phase drag of the liquid phase is less than the residual saturation of said bed against gravity drainage of the liquid phase and
  (c) said second fiber bed being a non-matting bed of randomly distributed fibers having a mean fiber diameter of at least about 25 microns packed to a bed voidage of from about 85 to 99%, said mean fiber diameter and voidage being selected such that the residual saturation of said second fiber bed against gas phase drag of the liquid phase is greater than the residual saturation of said second fiber bed against gravity drainage of the liquid phase.

9. A fiber bed separator as in claim 8 for highly efficient removal of aerosols from aerosol containing gases wherein the fibers of said first fiber bed have a mean diameter of from about 5 to 20 microns and wherein the fibers of said second fiber bed have a mean diameter of from about 25 to 35 microns.

10. A fiber bed separator as in claim 9 wherein the fibers of said first fiber bed are glass fibers packed to a bed density of from about 5 to 20 pounds per cubic foot.

11. A fiber bed separator as in claim 10 wherein the fibers of said first fiber bed are untreated hydrophilic long staple glass fibers of substantially uniform fiber diameter of from about 7 to 12 microns packed to a bed density of from about 10 to 16 pounds per cubic foot.

12. A fiber bed separator as in claim 8 for the treatment of aerosol containing glass at high bed velocities wherein the fibers of said first fiber bed have a mean diameter of from about 25 to 75 microns and wherein the fibers of said second fiber bed have a mean diameter of from about 30 to 300 microns and are larger in mean diameter than the fibers of said first fiber bed.

13. A fiber bed separator as in claim 12 wherein the fibers of said first fiber bed are glass fibers packed to a bed density of from about 3 to 15 pounds per cubic foot.

14. A fiber bed separator as in claim 13 wherein the fibers of said first fiber bed are untreated hydrophilic curly glass fibers of substantially uniform fiber diameter of from about 25 to 35 microns packed to a bed density of from about 5 to 10 pounds per cubic foot.

15. A fiber bed element for use in a fiber bed separator for removal of aerosols of less than 3 microns from a moving gas stream by flowing said gas stream through said fiber bed element, comprising, in the direction of said gas flow therethrough:
  (a) a first fiber bed and a second fiber bed in intimate fiber to fiber contact with each other such that an interface is formed between said first and second fiber beds,
  (b) said first fiber bed being a non-matting bed of randomly distributed fibers having a mean fiber diameter of at least about 5 microns packed to a substantially uniform bed voidage of from about 85% to 98%, said mean fiber diameter and said bed voidage being selected such that at design gas velocity and aerosol loading said first fiber bed will not flood with collected liquid phase and the residual saturation of said first fiber bed against gas phase drag of the liquid phase is less than the residual saturation of said first fiber bed against gravity drainage of the liquid phase, and
  (c) said second fiber bed being a non-matting bed of randomly distributed fibers having a mean fiber diameter of at least about 25 microns packed to a bed voidage of from about 85 to 99%, said mean fiber diameter and voidage being selected such that the residual saturation of said second fiber bed against gas phase drag of the liquid phase is greater than the residual saturation of said second fiber bed against gravity drainage of the liquid phase.

16. A fiber bed element as in claim 15 for highly efficient removal of aerosols from aerosol containing gases wherein the fibers of said first fiber bed have a mean diameter of from about 5 to 20 microns and wherein the fibers of said second fiber bed have a mean diameter of from about 25 to 35 microns.

17. A fiber bed element as in claim 16 wherein the fibers of said first fiber bed are glass fibers packed to a bed density of from about 5 to 20 pounds per cubic foot.

18. A fiber bed element as in claim 17 wherein the fibers of said first fiber bed are untreated hydrophilic long staple glass fibers of substantially uniform fiber diameter of from about 7 to 12 microns packed to a bed density of from about 10 to 16 pounds per cubic foot.

19. A fiber bed element as in claim 15 for the treatment of aerosol containing gases at high bed velocities wherein the fibers of said first fiber bed have a mean diameter of from about 25 to 75 microns and wherein the fibers of said second fiber bed have a mean diameter of from about 30 to 300 microns and are larger in mean diameter than the fibers of said first fiber bed.

20. A fiber bed element as in claim 19 wherein the fibers of said first fiber bed are glass fibers packed to a bed density of from about 3 to 15 pounds per cubic foot.

21. A fiber bed element as in claim 20 wherein the fibers of said first fiber bed are untreated hydrophilic curly glass fibers of substantially uniform fiber diameter of from about 25 to 35 microns packed to a bed density of from about 5 to 10 pounds per cubic foot.

* * * * *

UNITED STATES PATENT OFFICE
CERTIFICATE OF CORRECTION

Patent No. 4,086,070            Dated April 25, 1978

Inventor(s) Wesley B. Argo et al.

It is certified that error appears in the above-identified patent and that said Letters Patent are hereby corrected as shown below:

Column 19, line 31, "of the liquid phase and" should read --- of the liquid phase, and ---.

Column 19, line 57, "glass" should read --- gases ---.

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*